US011921343B2

(12) United States Patent
Blake, III et al.

(10) Patent No.: US 11,921,343 B2
(45) Date of Patent: Mar. 5, 2024

(54) OPTICAL SYSTEM

(71) Applicant: ZF FRIEDRICHSHAFEN AG, Friedrichshafen (DE)

(72) Inventors: Thomas E. Blake, III, Novi, MI (US); Matthew W. Warmuth, Northville, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 351 days.

(21) Appl. No.: 17/035,911

(22) Filed: Sep. 29, 2020

(65) Prior Publication Data

US 2022/0099913 A1 Mar. 31, 2022

(51) Int. Cl.
*G02B 7/02* (2021.01)
*G03B 17/12* (2021.01)
*G03B 17/55* (2021.01)

(52) U.S. Cl.
CPC .......... *G02B 7/028* (2013.01); *G02B 7/025* (2013.01); *G03B 17/12* (2013.01); *G03B 17/55* (2013.01)

(58) Field of Classification Search
CPC .......... G02B 7/00; G02B 7/02; G02B 7/7028; G02B 7/022; G02B 7/021; G02B 7/023; G02B 7/026; G02B 7/025; G02B 7/008; G02B 7/006; G02B 7/181; G02B 7/1805; G02B 7/09; G02B 9/64; G02B 7/28; G02B 27/0018; G02B 6/00; G02B 6/036; G03B 17/12; G03B 17/55; G03B 13/32; H04N 5/225; H04N 5/2252; H04N 5/2253; H04N 5/2254

USPC ........ 359/818–820, 808, 811, 740, 611, 900, 359/703, 704, 503, 506; 396/529–533, 396/526, 97, 98
See application file for complete search history.

(56) References Cited

U.S. PATENT DOCUMENTS

| 9,594,228 B1 | 3/2017 | Feng |
| 2019/0196134 A1* | 6/2019 | Yuan ...................... G02B 7/022 |
| 2020/0033549 A1 | 1/2020 | Liu et al. |

FOREIGN PATENT DOCUMENTS

JP 2016218139 * 12/2016 ............... G02B 7/02

OTHER PUBLICATIONS

English translation of JP 2016218139. (Year: 2016).*

* cited by examiner

*Primary Examiner* — Jie Lei
(74) *Attorney, Agent, or Firm* — TAROLLI, SUNDHEIM, COVELL & TUMMINO L.L.P.

(57) ABSTRACT

An optical system includes a substrate. An image sensor is on the substrate. The image sensor has an image plane. A lens barrel defines a mechanical axis that intersects the image sensor and image plane. The lens barrel has a first coefficient of thermal expansion (CTE). A lens mount is integrally formed with the lens barrel. The lens mount is connected to the substrate. The lens mount has a second CTE. At least one lens element is in the lens barrel on the mechanical axis and defines an optical axis. A last powered optical surface of the at least one lens element is spaced along the optical axis from the image plane by a back focal length. At least one of the first and second CTEs limiting a change in the back focal length as a result of a change in temperature of the optical system.

21 Claims, 2 Drawing Sheets

OPTICAL SYSTEM

FIELD OF THE INVENTION

The present invention is directed to an optical system and, in particular, to an optical system having a lens barrel integrally formed with a lens mount.

BACKGROUND OF THE INVENTION

An advanced driver assist system ("ADAS") for vehicles is known. One type of vehicle ADAS uses a forward facing camera system. The camera system is secured to the front windshield of the vehicle to provide a forward looking field of view in front of the vehicle. Such forward facing vehicle ADAS arrangements monitor the vehicle's forward operating environment and provide other vehicle systems with the monitored environment information to aid in operation of the vehicle. For example, the vehicle ADAS can monitor lane departure, assist in maintaining a vehicle in a road lane, provide lane centering/guidance, control operation of the high and/or low beam headlights, detect vehicle presence, provide forward crash warning, perform sign recognition, and/or apply automatic emergency braking in response to the detection of a pedestrian. A vehicle ADAS controller is connected to an output of the camera system and analyzes image output data from the camera.

The camera system can include a plurality of lens elements that direct light into an image sensor. A back focal length of the lens elements is selected so that the optical system is focused and a clear image is captured by the image sensor. Expansion or contraction in the camera system caused by a change in temperature of the camera system can cause a change in the selected back focal length, which can result in defocusing and degradation of image quality captured by the camera system.

SUMMARY OF THE INVENTION

According to one aspect, an optical system includes a substrate. An image sensor is on the substrate. The image sensor has an image plane. A lens barrel defines a mechanical axis that intersects the image sensor and image plane. The lens barrel has a first coefficient of thermal expansion (CTE). A lens mount is integrally formed with the lens barrel. The lens mount is connected to the substrate. The lens mount has a second CTE. At least one lens element is in the lens barrel on the mechanical axis and defines an optical axis that intersects the image sensor and image plane. A last powered optical surface of the at least one lens element is spaced along the optical axis from the image plane by a back focal length. At least one of the first and second CTEs limits a change in the back focal length as a result of a change in temperature of the optical system to prevent defocusing and degradation of an image received by the image sensor.

According to another aspect, alone or in combination with any other abstract, an optical system can include a substrate. An image sensor can be on the substrate. A lens barrel can define a mechanical axis that intersects the image sensor. A lens mount can be integrally formed with the lens barrel so that the lens barrel and mount are constructed as a single piece. The lens mount can be connected to the substrate and can connect the lens barrel to the substrate. At least one lens element can be in the lens barrel on the mechanical axis.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
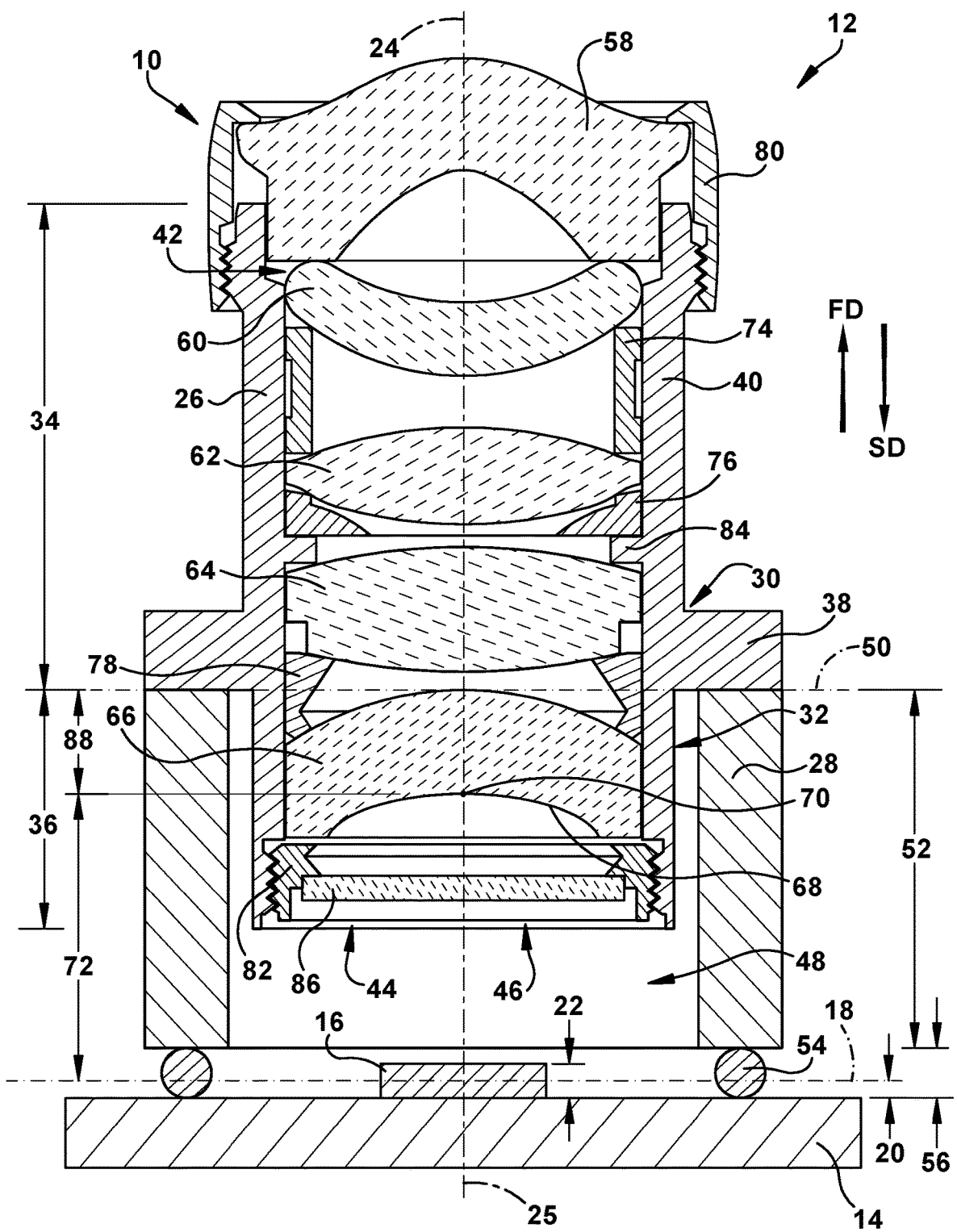
FIG. 1 is a sectional view of an optical system made in accordance with one embodiment of the present invention.

FIG. 1 illustrate an optical system 10 that can be utilized in an advanced driver assist system 12 ("ADAS") for a vehicle. When utilized in the ADAS 12, the optical system 10 can be secured to a window, such as a windshield, side window, or rear window, of a vehicle. The ADAS 12 can monitor the vehicle's operating environment and provide other vehicle systems with the monitored environment information to aid in operation of the vehicle. For example, the ADAS 12 can monitor lane departure, assist in maintaining a vehicle in a road lane, provide lane centering/guidance, control operation of the high and/or low beam headlights, detect vehicle presence, provide forward crash warning, perform sign recognition, and/or apply automatic emergency braking in response to the detection of a pedestrian. An ADAS controller can be connected to an output of the optical system 10 and analyze image output data from the optical system.

As shown in FIG. 1, the optical system 10 includes a substrate 14. The substrate 14 can be a printed circuit board ("PCB"), and thus will be referred to herein as a PCB. An image sensor 16 is on the PCB 14. The image sensor 16 can be connected to the PCB 14 in any desired manner, such as by soldering. The image sensor 16 defines an image plane 18 that is spaced from the PCB 14 by an image plane distance 20. One or more materials forming the image sensor 16 is selected so that the image sensor has a sensor coefficient of thermal expansion ("CTE") that defines how a length 22 of the image sensor, measured along a mechanical axis 24, changes, i.e., expands or contracts along the mechanical axis, with a change in temperature of the optical system 10. The change in the length 22 of the image sensor 16 causes the image plane distance 20 to correspondingly increase or decrease.

A lens barrel 26 is integrally formed with a lens mount 28 so that the lens barrel and mount are constructed as a single piece. The lens mount 28 and the lens barrel 26 are integrally formed as a single piece by a two-shot injection molding process or an insert molding process. The integrally formed lens barrel 26 and lens mount 28 are thus not joined together by fasteners, adhesive bonding, or soldering. The lens mount 28 connects the lens barrel to the PCB 14. The lens barrel 26 defines the mechanical axis 24. The mechanical axis 24 intersects the image sensor 16 and the image plane 18.

The lens barrel 26 has integrally formed first and second barrel portions 30, 32. The first and second barrel portions 30, 32 can be integrally formed by an injection molding process, an overmolding process, a two-shot injection molding process or an insert molding process. The first and second barrel portions 30, 32 can be formed from, for example, one or more of aluminum, brass and polymer. The one or more materials forming the first barrel portion 30 is selected so that the first barrel portion has a first barrel CTE that defines how a length 34 of the first barrel portion, measured along the mechanical axis 24, changes, i.e., expands or contracts along the mechanical axis, with a change in temperature of the optical system 10. The one or more materials forming the second barrel portion 32 is selected so that the second barrel portion has a second barrel CTE that defines how a length 36 of the second barrel portion, measured along the mechanical axis 24, changes, i.e., expands or contracts along the mechanical axis, with a change in temperature of the optical system 10.

Figure 2:
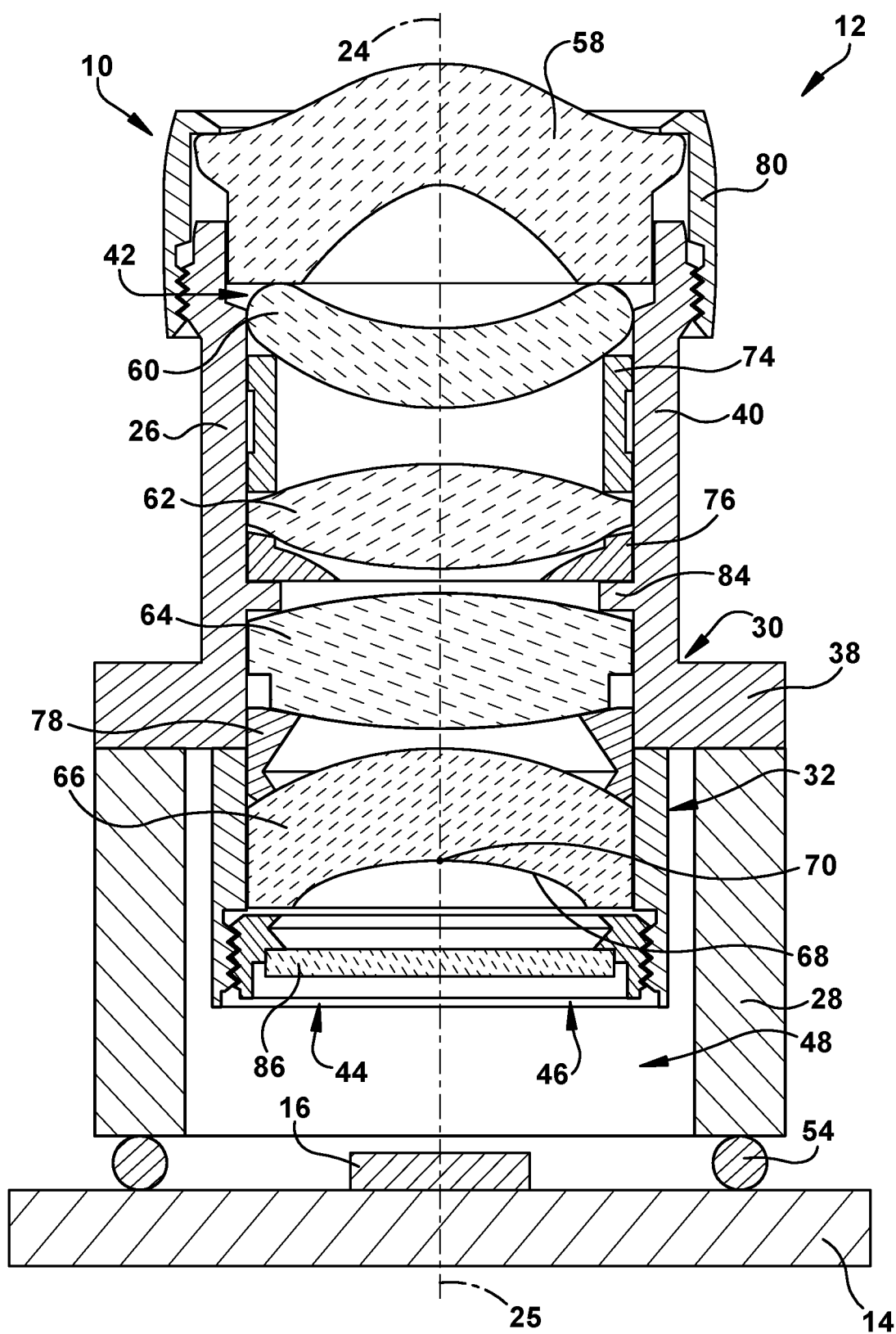
FIG. 2 is a sectional view of the optical system made in accordance with another embodiment of the present invention.

As shown in the example configuration of FIG. 1, the first and second barrel portions 30, 32 can be formed from the same material(s) so that the first and second barrel CTEs are the same. Alternatively, as shown in the example configuration of FIG. 2, the material compositions of the first and second barrel portions 30, 32 can be different so that the first barrel CTE is different from the second barrel CTE.

As shown in FIG. 1, the first barrel portion 30 includes a substantially cylindrical flange 38 and a substantially cylindrical portion 40 that extends from the flange along the mechanical axis 24 in a first direction FD away from the PCB 14. The first barrel portion 30 defines a first barrel opening 42 that extends along the mechanical axis 24 through the first barrel portion. The second barrel portion 32 is substantially cylindrical and extends in a second direction SD, which is opposite to the first direction FD, from the flange 38 toward the PCB 14. The second barrel portion 32 defines a second barrel opening 44 that extends along the mechanical axis 24 through the second barrel portion. The first and second barrel openings 42, 44 together form a lens barrel opening 46 that extends along the mechanical axis 24 through the entirety of the lens barrel 26.

The lens mount 28 is substantially cylindrical and extends in the second direction SD from the flange 38 along the mechanical axis 24. The lens mount 28 is directly connected to the PCB 14 by a layer of adhesive 54 between the lens mount and the PCB. The lens mount 28 defines a mount opening 48 into which the second barrel portion 32 extends. The lens mount 28 and the flange 38 engage one another at a connection plane 50 that extends transverse to the mechanical axis 24.

The lens mount 28 can be substantially cylindrical. Alternatively, the lens mount 28 can be constructed so that the interface between the lens mount and lens barrel 26 is substantially cylindrical while the interface between the lens mount and the PCB 14 is square or rectangular. Thus, the lens mount 28 can have a substantially cylindrical portion for interfacing with the lens barrel 26 and a substantially rectangular or square portion for interfacing with the PCB 14.

The lens mount 28 can be formed from, for example, one or more of aluminum, brass and polymer. The one or more materials forming the lens mount 28 is selected so that the lens mount has a mount CTE that defines how a length 52 of the lens mount, measured along the mechanical axis 24, changes, i.e., expands or contracts along the mechanical axis, with a change in temperature of the optical system 10.

The one or more materials forming the layer of adhesive 54 are selected so that the layer of adhesive has an adhesive CTE that defines how a length 56 of the layer of adhesive, measured along the mechanical axis 24, changes, i.e., expands or contracts along the mechanical axis, with a change in temperature of the optical system 10. Although the lens mount 28 is shown and described as being connected to the PCB 14 by the layer of adhesive 54, the lens mount can be connected to the PCB in any other desired manner, such as through soldering or one or more fasteners.

At least one lens element 58, 60, 62, 64, 66 is on the mechanical axis 24 in the lens barrel 26 and is used to direct light to the image sensor 16. As shown in the example configuration of FIG. 1, the first barrel portion 30 has a plurality of lens elements 58, 60, 62, 64 in first barrel opening 42 on the mechanical axis 24. The second barrel portion 32 has one lens element 66 in the second barrel opening 44 on the mechanical axis 24. Each of the lens elements 58, 60, 62, 64, 66 can be formed from one or more of glass, polymer, polycarbonate, acrylic glass and cyclic olefin copolymer. The one or more materials forming each of the lens elements 58, 60, 62, 64, 66 are selected so that each of the lens elements have a lens CTE that defines how a length of each of the lens elements, measured along the mechanical axis 24, changes, i.e., expands or contracts along the mechanical axis, with a change in temperature of the optical system 10.

The lens elements 58, 60, 62, 64, 66 define an optical axis 25 that intersects the image sensor 16 and the image plane 18. As shown in FIG. 1, the axes 24, 25 are coextensive. Alternatively, the axes 24, 25 can be substantially coextensive. Substantially coextensive axes 24, 25 can be offset from one another by an insignificant degree.

The lens element 66 defines a last powered optical surface 68 of the lens elements 58, 60, 62, 64, 66. The last powered optical surface 68 is the closest non-planar optical surface of the lens elements 58, 60, 62, 64, 66 to the image plane 18. A distance between the image plane 18 and an intersection point 70 on the last powered optical surface 68 at which the optical axis 25 intersects the last powered optical surface is referred to as a back focal length 72. The back focal length 72 is selected so that the optical system 10 is focused and a clear image is captured by the image sensor 16. The selected back focal length 72 can be determined based upon the temperature of the optical system 10 being 25° C.

The optical system 10 can further include one or more spacer elements 74, 76, 78 and/or one or more retainers 80, 82. The spacer elements 74, 76, 78 and the retainers 80, 82 hold the lens elements 58, 60, 62, 64, 66 in the lens barrel 26. As shown in FIG. 1, a plurality of spacer elements 74, 76, 78 are in the lens barrel 26. Each spacer element 74, 76, 78 engages two adjacent lens elements 58, 60, 62, 64, 66 or engages a lens element and an adjacent shoulder 84 of the lens barrel 26. The shoulder 84 extends radially into the first barrel opening 42 toward the mechanical axis 24. The spacer elements 74, 76, 78 can be formed from one or more of metal, aluminum, brass and polymer. The one or more materials forming the spacer elements 74, 76, 78 are selected so that each of the spacer elements has a spacer CTE that defines how a length of each of the spacer elements, measured along the mechanical axis 24, changes, i.e., expands or contracts along the mechanical axis, with a change in temperature of the optical system 10.

As shown in FIG. 1, a first retainer 80 can be connected, e.g., threadingly attached, to the first barrel portion 30. The first retainer 80 helps prevent the lens elements 58, 60, 62 and the spacer elements 74, 76 that are between the shoulder 84 and the first retainer from moving from a predetermined position in the lens barrel 26. A second retainer 82 can be connected, e.g., threadingly attached, to the second barrel portion 32. The second retainer 82 helps prevent the lens elements 64, 66 and the spacer element 78 that are between the shoulder 84 and the second retainer from moving from a predetermined position in the lens barrel 26. The first and second retainers 80, 82 can be formed from one or more of metal, aluminum, brass and polymer.

A filter lens 86 may be connected to the second retainer 82. The filter lens 86 extends along the mechanical axis 24. The filter lens 86 can help protect the image sensor 16 and the lens elements 58, 60, 62, 64, 66. The filter lens 86 can also alter the characteristics of light passing through the lens elements 58, 60, 62, 64, 66 to the image sensor 16. The filter lens 86 can be formed from one or more of polymer, glass, polycarbonate, polyphenylene sulfide, acrylic glass and cyclic olefin copolymer.

A change in temperature of the optical system 10 from 25° C. can cause a change in the selected back focal length 72 of the optical system. A change in the length 36 of the second barrel portion 32 as a result of a change in temperature of the optical system 10 from 25° C. can cause a distance 88 between the intersection point 70 and the connection plane 50 (referred to herein as the connection plane distance 88) to increase or decrease. The second barrel CTE causes the length 36 of the second barrel portion 32 to expand in the second direction SD toward the PCB 14 when the temperature in the optical system 10 increases. The second barrel portion 32 expands in the second direction SD because the flange 38 of the first barrel portion 30 prevents the second barrel portion from expanding in the first direction FD. The expanding second barrel portion 32 urges the intersection point 70 of the last optical surface 68 in the second direction SD away from the connection plane 50 to increase the connection plane distance 88. An increase in the connection plane distance 88 can decrease the selected back focal length 72. Conversely, the second barrel CTE causes the length 36 of the second barrel portion 32 to contract in the first direction FD away from the PCB 14 when the temperature in the optical system 10 decreases. The contracting second barrel portion 32 urges the intersection point 70 in the first direction FD toward the connection plane 50 to decrease the connection plane distance 88. A decrease in the connection plane distance 88 can increase the selected back focal length 72.

The mount CTE causes the length 52 of the lens mount 28 to expand in the first direction FD away from the PCB 14 when the temperature in the optical system 10 increases. The expanding lens mount 28 urges the lens barrel 26 and the connection plane 50 in the first direction FD away from the PCB 14. The expanding lens mount 28 also urges the lens elements 58, 60, 62, 64, 66 and the intersection point 70 in the first direction FD away from the image plane 18. Conversely, the mount CTE causes the length 52 of the lens mount 28 to contract in the second direction SD toward the PCB 14 when the temperature in the optical system 10 decreases. The contracting lens mount 28 urges the lens barrel 26 and the connection plane 50 in the second direction SD toward the PCB 14. The contracting lens mount 28 also urges the lens elements 58, 60, 62, 64, 66 and the intersection point 70 in the second direction SD toward the image plane 18.

The adhesive CTE causes the length 56 of the layer of adhesive 54 to expand in the first direction FD away from the PCB 14 when the temperature in the optical system 10 increases. The expanding layer of adhesive 54 urges the lens mount 28 and the lens barrel 26 in the first direction FD away from the PCB 14. The expanding layer of adhesive 54 also urges the lens elements 58, 60, 62, 64, 66 and the intersection point 70 in the first direction FD away from the image plane 18. Conversely, the adhesive CTE causes the length 56 of the layer of adhesive 54 to contract in the second direction SD toward the PCB 14 when the temperature in the optical system 10 decreases. The contracting layer of adhesive 54 urges the lens mount 28 and the lens barrel 26 in the second direction SD toward the PCB 14. The contracting layer of adhesive 54 also urges the lens elements 58, 60, 62, 64, 66 and the intersection point 70 in the second direction SD toward the image plane 18.

The sensor CTE causes the length 22 of the image sensor 16 to expand in the first direction FD away from the PCB 14 when the temperature in the optical system 10 increases. The expanding image sensor 16 urges the image plane 18 in the first direction FD away from the PCB 14 and toward the intersection point 70. The expanding image sensor 16 can thus increase the image plane distance 20. Conversely, the sensor CTE causes the length 22 of the image sensor 16 to contract in the second direction SD toward the PCB 14 when the temperature in the optical system 10 decreases. The contracting image sensor 16 urges the image plane 18 in the second direction SD toward the PCB 14 and away from the intersection point 70. The contracting image sensor 16 can thus decrease the image plane distance 20.

Another factor that affects the selected back focal length 72 is the summed effect of temperature on the lens elements ("Summed Effect"). The Summed Effect is a predetermined value that reflects how various factors urge the intersection point 70 toward or away from the image plane 18. The Summed Effect can include the change in the refractive indexes of the lens elements 58, 60, 62, 64, 66 as a result of a change in temperature of the optical system 10. The change in the refractive indexes of the lens elements 58, 60, 62, 64, 66 can be the primary factor that urges the selected back focal length 72 to change when the temperature in the optical system 10 changes from 25° C. The changes in the lengths of the lens elements 58, 60, 62, 64, 66 as a result of a change in temperature of the optical system 10 can be included in the Summed Effect. The Summed Effect can also include how the arcs of the lens elements 58, 60, 62, 64, 66 change in response to the temperature change. Changes in the lengths of the spacer elements 74, 76, 78 can also urge the lens elements 58, 60, 62, 64, 66 toward or away from the image plane 18. Therefore, the changes in the lengths of the spacer elements 74, 76, 78 can also be included in the Summed Effect.

The selected back focal length 72 can thus be urged to change based on how a change in temperature of the optical system 10 from 25° C. affects the second barrel portion 32, the lens mount 28, the layer of adhesive 54, the image sensor 16 and the lens elements 58, 60, 62, 64, 66. The following equation can be used to ensure that the change in the selected back focal local length 72 is limited or prevented in order to prevent defocusing and degradation of an image received by the image sensor 16:

$$\Delta BFL = SE + \Delta CPD - \Delta L_{LM} - \Delta L_{LOA} + \Delta IPD$$

where $\Delta BFL$ is the change in the selected back focal length 72, SE is the Summed Effect, $\Delta CPD$ is the change in the connection plane distance 88, $\Delta L_{LM}$ is the change in the length 52 of the lens mount 28, $\Delta L_{LOA}$ is the change in the length 56 of the layer of adhesive 54, and $\Delta IPD$ is the change in the image plane distance 20.

The materials and CTEs of one or more of the second barrel portion 32, the lens mount 28, the layer of adhesive 54, the image sensor 16, the lens elements 58, 60, 62, 64, 66 and the spacer elements 74, 76, 78 can be chosen such that the change in the selected back focal length $\Delta BFL$ as a result of a change in temperature of the optical system 10 is zero or approximately zero. Due to design constraints of the optical system 10, the second barrel portion 32 and the lens mount 28 may provide the most flexibility in choosing materials and CTEs. In one configuration, the materials forming the second barrel portion 32 and the lens mount 28 can be selected so that the second barrel and mount CTEs are the same in order to prevent or minimize the change in the selected back focal length ΔBFL. Alternatively, the materials forming the second barrel portion 32 and the lens mount 28 can be selected so that second barrel and mount CTEs are different in order to prevent or minimize the change in the selected back focal length ΔBFL.

Even though the second barrel portion 32 and the lens mount 28 are integrally formed together, the second barrel and mount CTEs can be made different from one another by using two different base materials to form the second barrel portion and the lens mount. In one example configuration, the base material of the second barrel portion 32 can be a polymer, such as polyphenylene sulfide ("PPS") while the base material of the lens mount 28 is aluminum. The PPS forming the second barrel portion 32 can be "unfilled." An unfilled PPS does not include a significant amount of filler material. The CTE of unfilled PPS is typically greater than the CTE of aluminum. Thus, in this example configuration, the second barrel portion 32 has a different, and greater, CTE than the lens mount 28.

Alternatively, the second barrel and mount CTEs can be made different even when the second barrel portion 32 and the lens mount 28 include the same base material. In one example configuration, the base material of both the second barrel portion 32 and the lens mount 28 can be PPS. The second barrel portion 32, however, can include about 45-70 percent PPS and about 30-55 percent filler material, such as glass fibres, glass beads, and/or mica. The lens mount 28 can include about 35-44 percent PPS and about 56-65 percent filler material. The filler material used in the second barrel portion 32 and the lens mount 28 typically cause the second barrel and mount CTEs to be lower than what the second barrel and mount CTEs would be if the second barrel portion and the lens mount did not include the filler material. Because the second barrel portion 32 contains a lower percentage of filler material than the lens mount 28, the second barrel CTE would be greater than the mount CTE. Thus, even when both the second barrel portion 32 and the lens mount 28 include the same base material, the second barrel and mount CTEs can be made different from one another by varying the amount of filler included in each of the second barrel portion and the lens mount. The second barrel and mount CTEs can also be made different when the second barrel portion 32 and the lens mount 28 have the same base material by varying the type of filler included in each of the second barrel portion and the lens mount.

The materials and CTEs of one or more features of the optical system 10, such as the second barrel portion 32 and/or the lens mount 28, can also be selected so that the change in the selected back focal length ΔBFL as a result of a decrease in temperature of the optical system 10 from 25° C. to a predetermined degree is about equal to the change in the selected back focal length as a result of an increase in temperature of the optical system from 25° C. to a predetermined degree. For example, the change in the selected back focal length ΔBFL when the optical system 10 is cooled from 25° C. to −40° C. can be about equal to the change in the selected back focal length when the optical system is heated from 25° C. to 105° C.

The lengths of one or more of the lens mount 28, the second barrel portion 32 and the layer of adhesive 54 can also be chosen such that the change in the selected back focal length ΔBFL as a result of a change in temperature of the optical system 10 from 25° C. is zero or approximately zero. The change in the length of the lens mount $\Delta L_{LM}$ is a component in the equation for helping to ensure that the change in the selected back focal length ΔBFL is limited or prevented. When the temperature optical system 10 changes from 25° C., the length 52 of the lens mount 28 changes by an amount proportional to the length of the lens mount at 25° C. and the change in temperature. Therefore, in selecting the length 52 of the lens mount 28 at 25° C., the $\Delta L_{LM}$ component can be tailored so that that the change in the selected back focal length ΔBFL as a result of a change in temperature of the optical system 10 from 25° C. is zero or approximately zero.

The change in the connection plane distance ΔCPD is another component in the equation for helping to ensure that the change in the selected back focal length ΔBFL is limited or prevented. When the temperature of the optical system 10 changes from 25° C., the connection plane distance 88 changes by an amount proportional to the length of the connection plane distance at 25° C. and the change in temperature. Therefore, in selecting the length of the connection plane distance 88 at 25° C., the ΔCPD component can be tailored so that that the change in the selected back focal length ΔBFL as a result of a change in temperature of the optical system 10 from 25° C. is zero or approximately zero.

If desired, the connection plane distance 88 at 25° C. can be increased from that shown in FIG. 1 by moving the lens element 66 and/or the intersection point 70 in the second direction SD relative to the connection plane 50. In order to accommodate this increase of the connection plane distance 88, the length 36 at which the second barrel portion 32 extends in the second direction SD from the flange 38 when the temperature of the optical system 10 is at 25° C. can be increased from that shown in FIG. 1. Conversely, the connection plane distance 88 at 25° C. can be decreased from that shown in FIG. 1 by moving the lens element 66 and/or the intersection point 70 in the first direction FD relative to the connection plane 50. In order to accommodate this diminution of the connection plane distance 88, the length 36 at which the second barrel portion 32 extends in the second direction SD from the flange 38 when the temperature of the optical system 10 is at 25° C. can be decreased from that shown in FIG. 1.

The connection plane distance 88 can be selected by selecting the location of the flange 38 along the mechanical axis 24 when the temperature of the optical system 10 is at 25° C. For example, the connection plane distance 88 in FIG. 1 can be increased by moving the flange 38 along the mechanical axis 24 in the first direction FD from the flange's position shown in FIG. 1, while maintaining the intersection point 70 at the position along the optical axis 25 in the lens barrel 18 shown in FIG. 1. Moving the flange 38 in the first direction FD can decrease the length 34 of the first barrel portion 30, as the first barrel portion includes the flange and the portion 40 that extends in the first direction from the flange. Moving the flange in the first direction FD can also increase the length 36 of the second barrel portion 32, as the second barrel portion is the portion of the lens barrel 26 that extends in the second direction SD from the flange 38. As another example, the connection plane distance 88 in FIG. 1 can be decreased by moving the flange 38 along the mechanical axis 24 in the second direction SD from the flange's position shown in FIG. 1, while maintaining the intersection point 70 at the position along the optical axis 25 in the lens barrel 18 shown in FIG. 1. Moving the flange 38 in the second direction SD can increase the length 34 of the first barrel portion 30, and can decrease the length 36 of the second barrel portion 32.

The change in the length of the lens mount $\Delta L_{LOA}$ is also component in the equation for helping to ensure that the change in the selected back focal length $\Delta$BFL is limited or prevented. When the temperature optical system 10 changes from 25° C., the length 56 of the layer of adhesive 54 changes by an amount proportional to the length of the layer of adhesive at 25° C. and the change in temperature. Therefore, in selecting the length 56 of the layer of adhesive 54 at 25° C., the $\Delta L_{LOA}$ component can be tailored so that that the change in the selected back focal length $\Delta$BFL as a result of a change in temperature of the optical system 10 from 25° C. is zero or approximately zero.

From the above description of the invention, those skilled in the art will perceive improvements, changes and modifications. Such improvements, changes and modifications within the skill of the art are intended to be covered by the appended claims.

Having described the invention, the following is claimed:

1. An optical system, comprising:
a substrate;
an image sensor on the substrate, the image sensor having an image plane;
a lens barrel defining a mechanical axis that intersects the image sensor and image plane, the lens barrel having first and second barrel portions that are integrally formed together so that the first and second barrel portions are constructed as a single piece, the first barrel portion including a flange from which the second barrel portion extends toward the substrate, the second barrel portion having a first coefficient of thermal expansion (CTE), the first barrel portion having a different CTE than the first CTE;
a lens mount integrally formed with the lens barrel so that the lens barrel and mount are constructed as a single piece, the lens mount engaging the flange and being connected to the substrate, the lens mount having a mount opening into which the second barrel portion extends, the lens mount having a second CTE; and
at least one lens element in the lens barrel on the mechanical axis and defining an optical axis that intersects the image sensor and image plane, a last powered optical surface of the at least one lens element being spaced along the optical axis from the image plane by a back focal length;
at least one of the second barrel portion having the first CTE and the lens mount having the second CTE limiting a change in the back focal length as a result of a change in temperature of the optical system to prevent defocusing and degradation of an image received by the image sensor.

2. The optical system recited in claim 1, wherein the lens mount and the flange engage one another at a connection plane that extends transverse to the mechanical axis, the change in temperature of the optical system causing a length of the second barrel portion, measured along the mechanical axis, to change, a change in the length of the second barrel portion correspondingly urging the last powered optical surface along the optical axis toward or away from the connection plane.

3. The optical system recited in claim 2, wherein the second barrel portions has therein the at least one lens element, the at least one lens element in the second barrel portion having the last powered optical surface, an increase in the length of the second barrel portion as a result of an increase in temperature of the optical system urging the last powered optical surface along the optical axis away from the connection plane, a decrease in the length of the second barrel portion as a result of an increase in temperature of the optical system urging the last powered optical surface along the optical axis toward the connection plane.

4. The optical system recited in claim 1, wherein each of the first and second barrel portions have therein at least one lens element positioned on the mechanical axis.

5. The optical system recited in claim 1, wherein the first and second CTEs are the same.

6. The optical system recited in claim 1, wherein the first and second CTEs are different from one another.

7. The optical system recited in claim 1, further comprising a layer of adhesive between the lens mount and the substrate that connects the lens mount to the substrate, the layer of adhesive having an adhesive CTE, the change in temperature of the optical system causing a length of the layer of adhesive, measured along the mechanical axis, to increase or decrease, an increase in the length of the layer of adhesive urging the last powered optical surface away from the image plane, a decrease in the length of the layer of adhesive urging the last powered optical surface toward the image plane.

8. The optical system recited in claim 1, wherein the image sensor has a third CTE, a change in temperature of the optical system causing a length of the image sensor, measured along the mechanical axis, to increase or decrease, an increase in the length of the image sensor urging the image plane toward the last powered optical surface, a decrease in the length of the image sensor urging the image plane away from the last powered optical surface.

9. The optical system recited in claim 1, wherein a length of the lens mount, measured along the mechanical axis, is selected to further limit the change in the back focal length as a result of the change in temperature of the optical system.

10. The optical system recited in claim 1, wherein the lens mount and lens barrel engage one another at a connection plane that extends transverse to the mechanical axis, the optical axis intersecting the last powered optical surface at an intersection point, a distance between the connection plane and the intersecting point, measured along the mechanical or optical axis, being selected to further limit the change in the back focal length as a result of the change in temperature of the optical system.

11. The optical system recited in claim 1, wherein the change in temperature of the optical system causes a change in at least one of a length of the at least one lens element, measured along the optical axis, an arc of the at least one lens element and the refractive index of the at least one lens element, the change in at least one of the length, arc and refractive index of the at least one lens element urging the last powered optical surface toward or away from the image plane.

12. The optical system recited in claim 11, further comprising at least one spacer element in the lens barrel to hold the at least one lens element in the lens barrel, the change in temperature of the optical system causing a length of the at least one spacer element, measured along the optical axis, to change, the change in the length of the at least one spacer element urging the last powered optical surface along the optical axis toward or away from the image plane.

13. An advanced driver assist system for a vehicle, comprising the optical system recited in claim 1.

14. The optical system recited in claim 1, wherein the integrally formed lens barrel and lens mount are not each constructed separately and then joined together.

15. The optical system recited in claim 1, wherein the at least one lens element comprises at least one first lens element in the first barrel portion and at least one second lens element in the second barrel portion, the at least one second lens element in the second barrel portion having the last powered optical surface.

16. The optical system recited in claim 1, wherein the lens barrel is a one-piece lens barrel.

17. An optical system, comprising:
a substrate;
an image sensor on the substrate;
a lens barrel defining a mechanical axis that intersects the image sensor, the lens barrel having first and second barrel portions that are integrally formed together so that the first and second barrel portions are constructed as a single piece, the first barrel portion including a flange from which the second barrel portion extends toward the substrate, the second barrel portion having a coefficient of thermal expansion (CTE) that is different than a CTE of the first barrel portion;
a lens mount integrally formed with the lens barrel so that the lens barrel and mount are constructed as a single piece, the lens mount engaging the flange and being connected to the substrate such that the lens mount connects the lens barrel to the substrate, the lens mount having a mount opening into which the second barrel portion extends; and
at least one lens element in the lens barrel on the mechanical axis.

18. The optical system recited in claim 17, wherein the image sensor has an image plane, a last optical surface of the at least one lens element being spaced along an optical axis defined by the at least one lens element from the image plane by a back focal length, the lens mount and flange engage one another at a connection plane that extends transverse to the mechanical axis, the optical axis intersecting the last powered optical surface at an intersection point, a distance between the connection plane and the intersection point, measured along the mechanical or optical axis, being selected to limit the change in the back focal length as a result of the change in temperature of the optical system.

19. The optical system recited in claim 17, wherein the image sensor has an image plane, a last optical surface of the at least one lens element being spaced along an optical axis defined by the at least one lens element from the image plane by a back focal length, a length of the lens mount, measured along the mechanical axis, being selected to limit the change in the back focal length as a result of the change in temperature of the optical system.

20. The optical system recited in claim 17, wherein the integrally formed lens barrel and lens mount are not each constructed separately and then joined together.

21. The optical system recited in claim 17, wherein the lens mount has a CTE that is different than at least one of the CTE of the second barrel portion and the CTE of the first barrel portion.

* * * * *